Dec. 8, 1925.
W. J. GUILD
1,564,667
GEARING FOR POWER TRANSMISSION
Filed Feb. 20, 1924     2 Sheets-Sheet 1
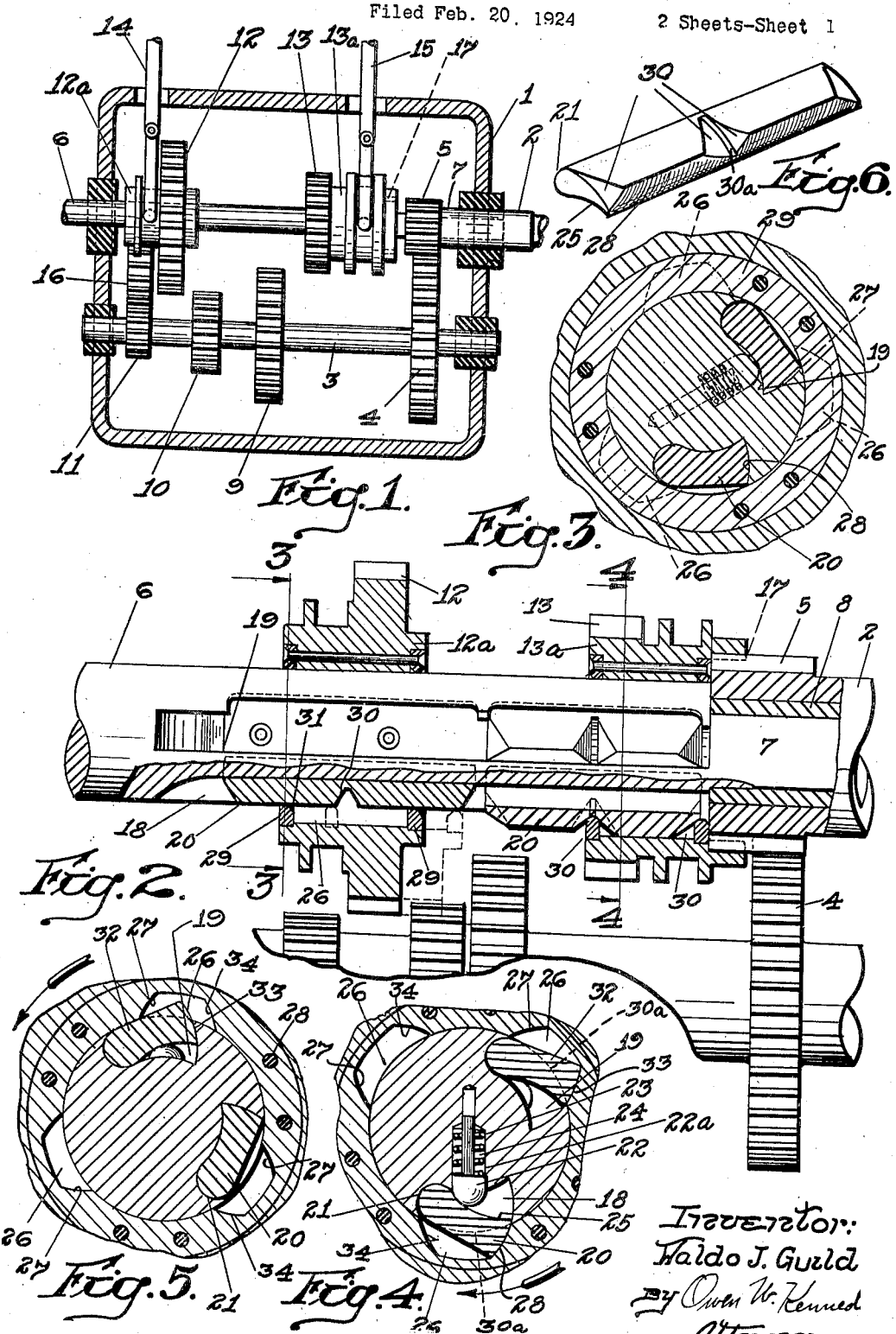
Inventor:
Waldo J. Guild
by Owen W. Kennedy
Attorney

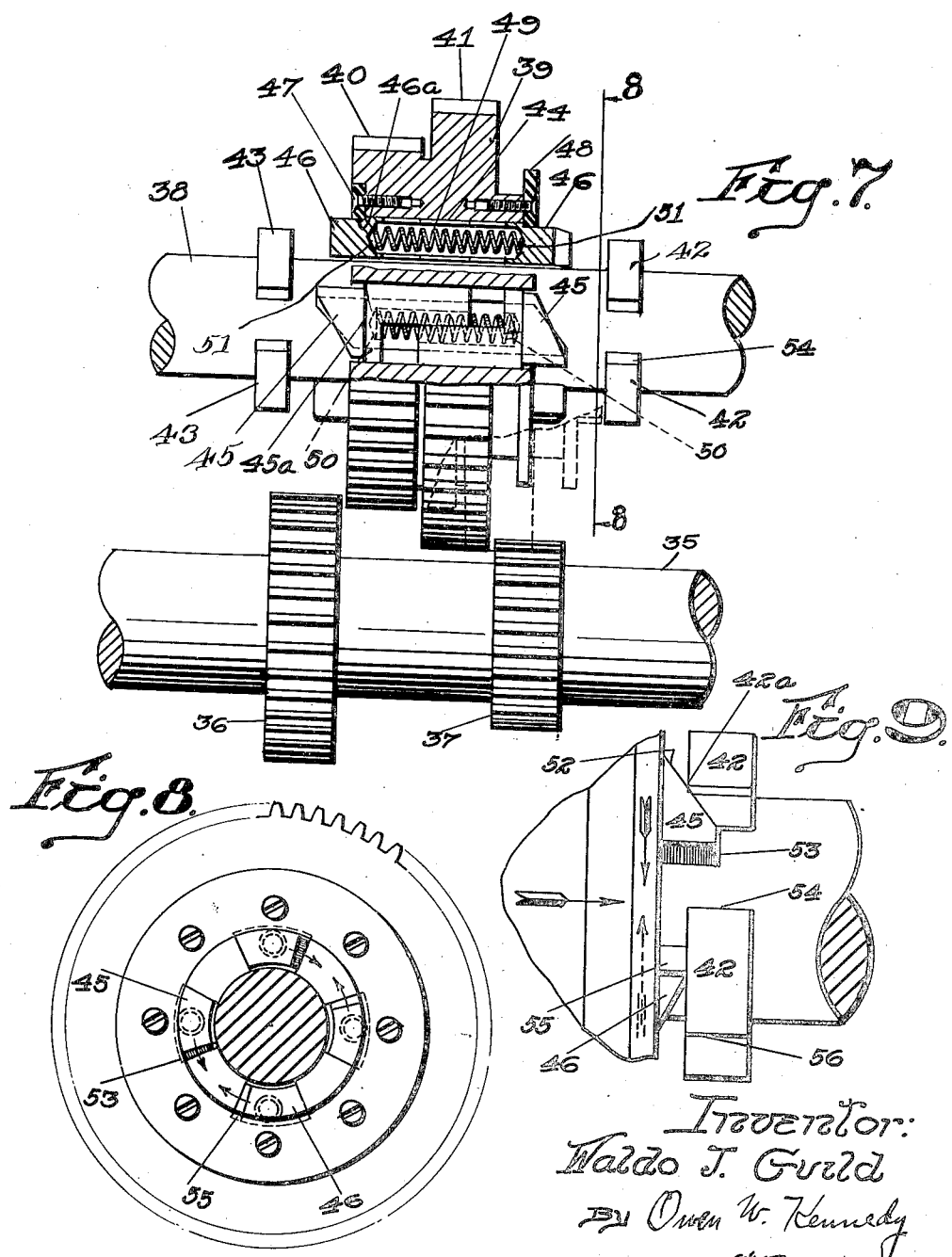

Patented Dec. 8, 1925.

1,564,667

UNITED STATES PATENT OFFICE.

WALDO J. GUILD, OF WORCESTER, MASSACHUSETTS.

GEARING FOR POWER TRANSMISSION.

Application filed February 20, 1924. Serial No. 694,054.

*To all whom it may concern:*

Be it known that I, WALDO J. GUILD, a citizen of the United States, residing at Worcester, in the county of Worcester and Commonwealth of Massachusetts, have invented a new and useful Improvement in Gearing for Power Transmission, of which the following, together with the accompanying drawings, is a specification.

My invention relates to gearing for transmitting mechanical power at different speeds and has particular reference to selective gearing of the type commonly employed in motor vehicles, although my improved gearing may as well be employed for transmitting power in other types of machinery which it is desired to drive at different speeds.

The main object of my invention is to provide a variable speed gearing in which the driving and driven gear wheels may be readily thrown into, or out of mesh without danger of stripping the teeth of any of the gear wheels, and with a minimum amount of wear on the teeth. My improved transmission gearing is particularly characterized by the fact that the engagement, or disengagement of the teeth of any pair of gear wheels is carried on while one wheel of a pair is running free, or in other words, while there is no load thereon.

The above and other advantageous features of my invention will hereinafter more fully appear, reference being had to the accompanying drawings in which Fig. 1 is a general view of a power transmission mechanism embodying my invention.

Fig. 2 is a longitudinal sectional view showing a portion of the parts of Fig. 1 on an enlarged scale.

Fig. 3 is a sectional view along the line 3—3, Fig. 2 looking in the direction of the arrows.

Fig. 4 is a sectional view along the line 4—4 Fig. 2 looking in the direction of the arrows.

Fig. 5 is a view similar to Fig. 4, showing the driving keys in an intermediate position.

Fig. 6 is a perspective view of one of the driving keys.

Fig. 7 is a longitudinal sectional view of a portion of a power transmission showing a modification of my invention.

Fig. 8 is a sectional view along the line 8—8 of Fig. 7, looking in the direction of the arrows.

Fig. 9 is a fragmentary view illustrating the operation of my modified driving connection.

Like reference characters refer to like parts in the different figures.

Referring first to Fig. 1, my improved gearing is shown for purposes of illustration as being enclosed in a suitable casing or gear box 1, which serves to rotatably support one end of a drive shaft 2 connected to a suitable source of power, not shown. A countershaft 3 is rotatably supported in the gear box 1 below the drive shaft 2 and has mounted thereon a gear 4 which is continuously in mesh with a gear 5 provided at the end of the drive shaft 2. A driven, or tail shaft 6 is rotatably mounted in the gear box 1 coaxial with the drive shaft 2, a reduced portion 7 of the driven shaft 6 being rotatably supported within a hollow portion of the drive shaft 2 by means of a sleeve bearing 8, as best shown in Fig. 2.

The countershaft 3 has keyed thereon a plurality of drive gears 9, 10 and 11 which decrease in diameter in the order named. The tail shaft 6 carries loose gears 12 and 13 which are adapted to be shifted longitudinally of the shaft 6 by any suitable means, such as shifting levers 14 and 15 respectively, cooperating with sleeves 12$^a$ and 13$^a$ integral with the gears 12 and 13. The gear 12 is adapted to be thrown into mesh with the gear 10 so as to transmit rotation of the drive shaft 2 to the tail shaft 6 with a considerable speed reduction, through the gears 5 and 4, and 10 and 12. The gear 12 is also adapted to be thrown into mesh with an idler gear 16 which is permanently in mesh with the gear 11 so as to transmit power from the shaft 2 to the shaft 6 at a reduced speed, in a reverse direction.

The gear 13 is adapted to be thrown into mesh with the gear 9 so as to transmit power between the shaft 2 and the shaft 6 with a decreased speed reduction, and the gear sleeve 13$^a$ is provided with internal teeth 17 which are adapted to be thrown into mesh with the gear 5 on shaft 2 to provide a direct driving connection between the shafts 2 and 6. The speed variations attainable by shifting the gears 12 and 13 correspond to the three speeds forward and one reverse, usually employed in the transmission of a motor vehicle, although various other arrangements of gearing to obtain other speed relations for different power applications may be employed in connection with my invention, as will hereinafter more fully appear.

As previously pointed out, the gears 12 and 13, together with their sleeves 12ª and 13ª, are slidable longitudinally of the shaft 6, and in the position of the parts shown in Fig. 1, the gears 12 and 13 are in their neutral position, that is, entirely out of engagement with the teeth of any of the gears 5, 9, 10 and 16. In this neutral position, both the gears 12 and 13 are free to turn on the shaft 6, and in carrying out my invention, the gears 12 and 13 are still loose on the shaft 6 when either gear is moved to the right, or to the left, into mesh with the teeth of any one of the positively driven gears 5, 9, 10 and 16. In other words, neither of the gears 12 and 13 are connected to the load represented by the shaft 6 until after its teeth are in mesh with one of the driving gears, and my improved arrangement for bringing about a driving connection between either of the gears 12 and 13 and the shaft 6 will now be described.

Referring now to Figs. 2 to 6 inclusive, that portion of the shaft 6 on which the gears 12 and 13 are slidable is provided with longitudinal grooves or keyways 18 and 19 which are spaced apart peripherally on the shaft 6, as shown in Fig. 4. A pair of driving elements or keys 20, 20 are received in the keyway 18, each key 20 having a length substantially equal to twice the travel of the gear sleeves 12ª and 13ª and the keyway 18 being so formed as to prevent longitudinal movement of the keys 20 therein. As best shown in Fig. 6, each key 20 is rounded along one edge, as shown at 21, to the same curvature as the end of its keyway 18, as shown in Fig. 4, so that the key 20 is turnable as a whole in the keyway 18. A plurality of thrust pins 22 are received in radial openings 23 provided in the shaft 6, a reduced portion 22ª of each pin being surrounded by a spring 24 which tends to maintain the end of the pin 22 in engagement with the under surface 25 of the key 20. The pins 22 thus exert a force on the keys 20 tending to turn them outwardly from the keyways 18, such turning movement, however, being controlled by the position of the corresponding gear sleeves 12ª and 13ª, as will now be described.

As clearly shown in Figs. 3, 4 and 5, each of the gear sleeves 12ª and 13ª is provided around its inner periphery with a plurality of spaced key seats 26, 26, the end surfaces 27 of which have substantially the same form or curvature as the end surfaces 28 of the keys 20 so as to snugly receive the keys when the latter are permitted to turn outwardly into any one of the seats 26, as shown in Fig. 4. When the gear sleeve 12ª occupies the neutral position shown in Fig. 2, the corresponding key 20 is positively maintained within its keyway 18 by rings 29 carried by the sleeve 12ª at the ends of the key seats 26. As clearly shown in Fig. 3, the rings 29 have substantially the same inside diameter as the shaft 6, so that with the gear 12 in its neutral position, the key 20 is held flush with the shaft 6.

When the gear 12 is moved longitudinally to the right on the shaft 6 to bring its teeth into engagement with the teeth of the gear 10, the rings 29 continue to maintain the key 20 in its retracted position in the keyway 18 as the gear teeth are first engaged, and the gear 12 being free to turn on the shaft 6, no power is transmitted thereto. As the gear 12, however, is shifted farther to bring its teeth into more complete engagement with the teeth of the gear 10, as indicated in dotted lines, the rings 29 simultaneously encounter bevelled surfaces 30 provided on the key 20, in which position the pins 22 are free to turn the key 20 outwardly into the next key seat 26 which is brought into register with the keyway 18 by the turning of the gear 12 in the direction of the arrow, as indicated in Fig. 4. As a seat 26 comes into complete register with the keyway 18, the end surface 28 of the key 20 completely abuts the end surface 27 of the seat 26 and thereby causes the turning movement of the gear 12 to be transmitted to the shaft 6. In this position, the flat surface 30ª between the bevel surfaces 30 of the key 20 comes to bear on the inner periphery of a ring 29, thereby limiting the outward turning movement of the key and preventing it from moving entirely out of its keyway 18, as shown in Fig. 4.

The position which the parts then occupy is clearly shown in Fig. 4, which being a section along line 4—4 of Fig. 2, shows the connection of the gear 13 to the shaft 6 when the gear 13 is moved to the right to bring the teeth 17 into engagement with the teeth of gear 5. It is obvious that the seating of the key 20 will not occur until after the teeth 5 and 17 are partly in mesh, so that the bevelled surfaces 30 of the key 20 are engaged by the rings 29. In order to assist in the free turning movement of the keys 20, the edges of the rings 29 are bevelled, as indicated at 31. When the gear 13 is moved to the left to return it to the neutral position shown in Fig. 1, with the teeth 17 out of engagement with the gear 5, the bevelled edges 31 of the rings 29 press against the bevel surfaces 30 of the key 20 and easily turn the key 20 back into its keyway 18, thereby disconnecting the gear 13 from the shaft 6.

Referring now to Fig. 5, keys 32 are received in the keyway 19, each of the keys 32 being identical in form to the keys 20. The locking surface 33 of each key 32, however, faces oppositely with respect to the locking surface 28 of each key 20, so that when either the gear 12 or the gear 13 is shifted into mesh with any one of the cooperating driving gears, the locking surface 33 of the corresponding key 32 will closely engage the end surface 34 of one of the seats 26, which surface 34 is opposite to the end surface 27.

When a key 32 is so received in a seat 26, it is obvious from an inspection of Fig. 4, that if the direction of rotation is as indicated by the arrow, the key 20 will transmit power, while the key 32 will prevent any tendency toward relative rotation between the gear 13 and the shaft 6 in the opposite direction. On the other hand, when the direction of rotation is as indicated by the arrow in Fig. 5, the key 32 will transmit power, this being the condition when the gear 12 is moved into mesh with the idler gear 16, or when the relation between load and power, as regards the shafts 2 and 6 is reversed, as when the friction of a motor vehicle engine is used as a brake. It is apparent then that irrespective of the direction of rotation of the driving gear, power may be transmitted to the shaft 6 through the keys 20 and 32 in such a manner that it will be impossible for either key to become unlocked from its driving position, due to backlash of the gearing, or resistance to movement of the shaft 6.

Referring again to Fig. 5, it should be noted at this point that while this view is not a true section along the line 4—4 of Fig. 2, it clearly illustrates the action of the keys 20 and 32 after either one of the loose gears 12 or 13 has been moved completely into mesh with one of its cooperating driven gears, but before the loose gear has been turned enough to bring its seats 26 into alinement with the keyways 18 and 19, as shown in Fig. 4. With the parts in this position, the rings 29 of the gear sleeve have cleared the bevel surfaces 30 of both keys so that the key 32 is free to enter a seat 26 as the gear sleeve turns in the direction of the arrow, with the action of a ratchet device. At the same time, the key 20 is held in its keyway 18 by the inner periphery of the gear sleeve alone, so that when continued rotation of the gear sleeve brings the end surface 34 of a seat 26 into abutment with the end surface 33 of the key 32, the key 20 is simultaneously projected completely into the next seat 26. With the key 20 thus seated, it is evident from Fig. 4, that the abutting surfaces 27 and 28 will effectively lock the gear sleeve 13ª and shaft 6 against backlash. It also follows that should the direction of rotation be the reverse of that shown in Fig. 5, the key 20 would be the first to ratchet into a seat 26, followed by the key 32.

From the foregoing description of the functioning of the parts, it is obvious that power may be transmitted from the driving shaft 2 to the tail shaft 6 with a number of different speed relations therebetween determined by the ratios between the different pairs of gears. It is obvious that speed reductions other than those represented by the gears shown in the drawings may be obtained in carrying out my invention the only requirement being that the slidable gear of a given set shall be connected to its shaft by my improved arrangement of locking keys. It is also obvious that the relation of the keys to the gear sleeve could be reversed without departing from my invention, that is to say, the keys could be carried by the gear sleeve and be projected into suitable seats on the shaft 6.

In operation, my improved device insures that the shifting of the gears to obtain different speed relations is always carried out without any serious clashing, or wearing of the teeth, by reason of the fact that the shiftable gears are always brought into engagement with the driving gears while free to turn on the shaft to which power is transmitted. The actual connection of a loose gear to the power shaft takes place automatically and with an easy ratcheting action as the operator completes the shifting of the gear and there is no possibility of this driving connection taking place until the teeth of the gears are well in mesh. In other words, there is no necessity for the operator to "feel" the gears into mesh as in the ordinary selective gear transmission.

Referring now to Figs. 7, 8 and 9, there is shown a modification of the arrangement just described, in which the shiftable gears are adapted to be connected to the driven shaft by means of driving elements having a rectilinear movement which are adapted to establish the driving connection after a pair of gears are partially in mesh, in substantially the same manner as the rocking elements. For the sake of brevity, the modified arrangement is illustrated in connection with only one set of gears, it being obvious that the same arrangement can be carried out with respect to a complete set of selective gearing, such as is shown in Fig. 1.

Referring first to Fig. 7, a continuously driven shaft 35, which corresponds to the countershaft 3 of Fig. 1, carries a number of gears 36 and 37 of different diameters. A shaft 38, which corresponds to the driven shaft 6 of Fig. 1, carries a gear member 39 which is shiftable longitudinally of the shaft 38 in substantially the same manner as the gears 12 and 13 of Fig. 1. The gear member 39 is provided with sets of teeth 40 and 41 which are adapted to be engaged with the gears 36 and 37 respectively, by the shifting movement of the entire gear member 39. The shaft 38 is provided around its periphery with sets of radially projecting lugs 42 and 43, arranged on opposite sides of the gear member 39, and when the gear member 39 is shifted to the left or to the right, these lugs cooperate with driving elements carried by the gear member 39, as will now be described.

The inner periphery of the gear member 39 is provided with spaced openings 44, within which are received pairs of slidable driving elements or dogs 45, 45 and 46, 46. The dogs 45 and 46 are provided with shoulders 45ª and 46ª which are normally maintained against annular plates 47 and 48 secured to the gear member 39 by means of springs 49 located in the openings 44. The ends of the springs 49 are received in seats 50 and 51 provided in the dogs 45 and 46 respectively, so that the dogs of each pair are yieldingly maintained in the position shown in Fig. 7, in which the gear member 39 is in its neutral position, with dogs of each pair projecting from opposite faces thereof.

When the gear member 39 is shifted to the right to bring the teeth 41 into engagement with the teeth of the gear 37, it is obvious that the gear member 39 will rotate freely on the shaft 38 when the engagement has been carried out to the extent indicated in dotted lines. As the gear member 39 is moved to its final position with the teeth completely in mesh, the several dogs 45 and 46 will tend to be projected into the spaces between the lugs 42 on the shaft 38, and the action of one of the dogs 45 is illustrated in Fig. 9. At this moment, the dog 45 has a combined movement of rotation and translation, as indicated by the arrows, and it is obvious that if the corner 42ª of a lug 42 strikes the inclined surface 52 of the dog 45, the dog 45 will yield inwardly against the action of the spring 49 until the rotational movement of the dog 45 carries the surface 52 past the corner 42ª. As this occurs, it is obvious that the spring 49 forces the dog 45 outwardly with a ratcheting action until it is projected completely into the space between adjacent lugs 42, in which position the surface 53 of the dog 45 abuts the surface 54 of the lug 43 and the shaft 38 is driven with the gear member 39.

At this point, it should be noted that the driving surfaces 55 of the dogs 46 face oppositely to the driving surfaces 53 of the dogs 45, as clearly shown in Fig. 8; also when the dog 45 occupies the position shown in Fig. 9, the next adjacent dog 46 is being forced back against its spring 49 by contact with the face of the lug 42. When, however, the dog 45 is fully projected between a pair of lugs 42 to bring its driving surface 53 into abutment with the lug surface 54, the dog 46 is immediately projected into the next adjacent space with its driving surface 55 in abutment with the surface 56 of the same lug 42 with which the dog 45 is engaged. Inasmuch as the driving surfaces 53 and 55 face oppositely with respect to rotative movement of the gear member 39, it follows that the gear member 39 is securely locked to the shaft 6 against back-lash, or any other reversal of driving effort. Furthermore, it is obvious from an inspection of Fig. 9, that should the gear member 39 be rotating in the direction of the dotted arrow, the dogs 46 will first ratchet into driving position between the lugs 42, followed by the dogs 45.

From the foregoing discussion of the modified arrangement shown in Figs. 7 to 9 inclusive, it is apparent that the longitudinally movable driving elements 45 and 46 are adapted to automatically establish a driving connection between a loose gear and the shaft 6, in either direction of rotation in much the same manner that the pivotally movable driving elements 20 and 32 are adapted to establish a driving connection between the corresponding members. In either embodiment of my invention the ratcheting action of the driving elements is essentially the same and, when once established, the driving connection is maintained irrespective of the angular direction of the driving effort.

I claim,

1. In a transmission gearing, the combination with a rotatable shaft having a gear member shiftable and rotatable thereon, of yieldable driving elements disposed to engage individually in one direction of rotation but grouped to engage in opposite directions and operative in one position of said gear on said shaft to automatically establish a driving connection therebetween.

2. In a transmission gearing, the combination with a rotatable shaft having a gear member shiftable and rotatable thereon, of yieldable driving elements adapted in one position of said gear on said shaft to permit relative rotative movement therebetween, and adapted in another position of said gear to automatically establish a driving connection between said gear and said shaft, a number of said driving elements facing to engage in one direction of rotation, the remainder facing to engage in the opposite direction of rotation.

3. In a transmission gearing, the combination with a rotatable shaft having a gear member shiftable and rotatable thereon, of a pair of yieldable driving elements adapted in one position of said gear on said shaft to permit relative rotative movement therebetween, and adapted in another position of said gear on said shaft to automatically establish a driving connection therebetween by a ratcheting action, each element of said pair disposed to engage in a direction of rotation opposite to that for which the other element is disposed.

4. In a transmission gearing, the combination with a shaft having a gear turnable therewith, and a second shaft having a gear shiftable thereon into and out of mesh with said first named gear, of a key rockable on said second named shaft for connecting said shiftable gear thereto, said shaft having a thrust receiving surface opposite the thrust receiving surface of said key.

5. In a transmission gearing, the combination with a shaft having a gear turnable therewith, and a second shaft having a gear shiftable thereon into and out of mesh with said first named gear, of a key rockable on said second named shaft for automatically connecting said shiftable gear thereto when the said gears are in mesh a predetermined amount, said shaft having a thrust receiving surface of revolution different from the thrust receiving surface of revolution of said key.

6. In a transmission gearing, the combination with a shaft having a gear turnable therewith, and a second shaft having a gear shiftable thereon into and out of mesh with said first named gear, of a key turnable about a pivotal axis parallel to the axis of said second named shaft for automatically connecting said shiftable gear thereto when said shiftable gear is moved into mesh with said first named gear a predetermined amount, said key having two distinct but concentric surfaces of revolution, oppositely disposed, one to receive thrust and the other to transmit it.

7. In a transmission gearing, the combination with a shaft having a gear turnable therewith, and a second shaft having a gear shiftable thereon into and out of mesh with said first named gear, of a key turnable about a pivotal axis parallel to the axis of said second named shaft for automatically connecting said shiftable gear thereto, pivotal movement of said key being controlled by the position of said shiftable gear, said key having two distinct but concentric surfaces of revolution, oppositely disposed, one to receive thrust and the other to transmit it, whereby the relative force exerted between said shaft and said shiftable gear will not exert any tendency either to hold said key in engagement with said gear or to drive it back in said shaft.

8. In a transmission gearing, the combination with a shaft having a gear turnable therewith, and a second shaft having a gear shiftable thereon into and out of mesh with said first named gear, of a pair of keys turnable about pivotal axes parallel to the axis of said second named shaft for automatically connecting said shiftable gear thereto for either direction of rotation, said keys each having a thrust receiving surface and a thrust transmitting surface, the respective sets of surfaces facing in opposite directions.

9. In a transmission gearing, the combination with a shaft having a gear turnable therewith, and a second shaft having a gear shiftable thereon into and out of mesh with said first named gear, of a pair of keys turnable in opposite directions about pivotal axes parallel to the axis of said second named shaft for automatically connecting said shiftable gear thereto for either direction of rotation, said keys each having a thrust receiving surface and a thrust transmitting surface, the respective sets of surfaces facing in opposite directions.

10. In apparatus of the class described, a shaft, a gear shiftable longitudinally thereon, a pair of keys rockable on axes parallel to said shaft, recessed portions in the internal periphery of said gear for engagement with said keys, said keys having oppositely disposed faces for engaging surfaces in said recessed portions, and said shaft having oppositely disposed thrust receiving surfaces for receiving said keys, the two sets of surfaces being opposed so as to receive the pressure between said shaft and gear by compression only of said key.

11. In apparatus of the class described, a shaft, a gear shiftable longitudinally thereon, a pair of keys rockable on axes parallel to said shaft, recessed portions in the internal periphery of said gear for engagement with said keys, said keys having oppositely disposed faces for engaging surfaces in said recessed portions, and said shaft having oppositely disposed thrust receiving surfaces for receiving said keys, the two sets of surfaces being opposed so as to receive the pressure between said shaft and gear by compression only of said key, and springs mounted in said shaft pressing each key outwardly.

WALDO J. GUILD.